United States Patent
Coufal et al.

(10) Patent No.: US 7,823,173 B2
(45) Date of Patent: Oct. 26, 2010

(54) REMOVABLE DISK MEDIA INCLUDING HOLOGRAPHIC OPTICAL DISK STACKED IN A TAPE CARTRIDGE SHELL

(75) Inventors: Hans-Juergen Coufal, San Jose, CA (US); Kirby G. Dahman, Seattle, WA (US); Glen A. Jaquette, Tucson, AZ (US); Mark A. Taylor, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 1118 days.

(21) Appl. No.: 11/350,547

(22) Filed: Feb. 9, 2006

(65) Prior Publication Data

US 2007/0183084 A1 Aug. 9, 2007

(51) Int. Cl.
*G11B 15/68* (2006.01)
*G11B 21/08* (2006.01)

(52) U.S. Cl. .................. 720/718; 369/30.4; 360/92.1

(58) Field of Classification Search ............. 360/92.1; 369/30.4, 30.65; 720/718, 725
See application file for complete search history.

(56) References Cited

U.S. PATENT DOCUMENTS

| | | | |
|---|---|---|---|
| 5,022,019 A | 6/1991 | Motoyoshi et al. | |
| 5,200,938 A | 4/1993 | Akiyama et al. | |
| 5,265,078 A | 11/1993 | Akiyama et al. | |
| 5,882,555 A * | 3/1999 | Rohde et al. | 264/1.33 |
| 6,216,057 B1 * | 4/2001 | Jesionowski | 700/214 |
| 6,534,142 B1 * | 3/2003 | Hummell et al. | 428/40.1 |
| 6,757,694 B2 * | 6/2004 | Goodman et al. | 707/104.1 |
| 6,867,942 B2 | 3/2005 | Albrecht et al. | |
| 6,868,487 B2 | 3/2005 | Beeston et al. | |
| 6,943,976 B2 * | 9/2005 | Goodman et al. | 360/69 |
| 6,948,182 B2 * | 9/2005 | Ito | 720/745 |
| 6,970,318 B2 * | 11/2005 | Goodman et al. | 360/69 |
| 7,123,445 B2 * | 10/2006 | Spychalla | 360/133 |

(Continued)

FOREIGN PATENT DOCUMENTS

EP 1498902 A2 1/2005

(Continued)

OTHER PUBLICATIONS

English Abstract of Chinese patent CN1043031A published Jun. 13, 1990.

(Continued)

*Primary Examiner*—Brian E Miller
(74) *Attorney, Agent, or Firm*—Rabindranath Dutta; Konrad Raynes & Victor LLP

(57) ABSTRACT

An automated data storage library employing a media accessor, an optical disk drive and a removable disk media. The media accessor includes a cartridge shell gripper. The optical disk drive includes a tape cartridge slot. The removable disk media includes a tape cartridge shell having a structural configuration operable to be physically engaged by the cartridge shell gripper and operable to be physically inserted into the tape cartridge slot by the cartridge shell gripper. The removable disk media further includes one or more optical disks disposed within the tape cartridge shell. A recording surface of each optical disk is extractable, partially or entirely, from the tape cartridge shell by the optical disk drive for writing data onto the optical disk and/or reading data from the optical disk.

10 Claims, 11 Drawing Sheets

U.S. PATENT DOCUMENTS

| | | | |
|---|---|---|---|
| 7,200,001 B2 * | 4/2007 | Spychalla | 361/679.33 |
| 7,272,081 B2 * | 9/2007 | Goodman et al. | 369/30.27 |
| 7,281,255 B2 * | 10/2007 | Kuo | 720/623 |
| 7,383,560 B2 * | 6/2008 | Edwards | 720/725 |
| 7,502,308 B2 * | 3/2009 | Nakayama et al. | 369/275.4 |
| 2001/0022773 A1 * | 9/2001 | Pergl | 369/272 |
| 2003/0135672 A1 * | 7/2003 | Yip et al. | 710/72 |
| 2004/0004931 A1 * | 1/2004 | Pergl | 369/283 |
| 2004/0042122 A1 | 3/2004 | Honda | |
| 2004/0090880 A1 | 5/2004 | Katao | |
| 2004/0181388 A1 * | 9/2004 | Yip et al. | 703/25 |
| 2004/0190430 A1 * | 9/2004 | Smith et al. | 369/275.1 |
| 2004/0202055 A1 | 10/2004 | Knight et al. | |
| 2004/0252601 A1 * | 12/2004 | Nagatomo et al. | 369/47.17 |
| 2004/0268379 A1 | 12/2004 | Qualls | |
| 2005/0117493 A1 | 6/2005 | Sueki et al. | |
| 2005/0152670 A1 | 7/2005 | Skaar | |
| 2005/0240953 A1 * | 10/2005 | Awano | 720/670 |
| 2006/0005217 A1 * | 1/2006 | Leonhardt et al. | 720/725 |
| 2007/0008872 A1 * | 1/2007 | Spychalla | 369/292 |
| 2008/0080325 A1 * | 4/2008 | Choi et al. | 369/30.04 |
| 2008/0117792 A1 * | 5/2008 | Rowe et al. | 369/275.3 |

FOREIGN PATENT DOCUMENTS

| | | |
|---|---|---|
| JP | 2053276 | 2/1990 |
| JP | 11250494 | 9/1999 |

OTHER PUBLICATIONS

Document record for JP02722512B2 published Mar. 4, 1998.

English machine translation of Japanese patent JP11250494 published Sep. 17, 1999.

Chinese Patent Office cited reference sheet dated May 9, 2008 for TUC920050136CN1.

English Abstract of Japanese patent JP2053276 published Feb. 22, 1990.

English Abstract of Japanese patent JP11250494 published Sep. 17, 1999.

* cited by examiner

REMOVABLE DISK MEDIA INCLUDING HOLOGRAPHIC OPTICAL DISK STACKED IN A TAPE CARTRIDGE SHELL

FIELD OF THE INVENTION

The present invention generally relates to automated data storage libraries, and more particularly, to an automated data storage library employing removable disk media including holographic optical disks.

BACKGROUND OF THE INVENTION

Automated data storage libraries are known for providing cost effective storage and retrieval of large quantities of data. The data in automated data storage libraries is stored on data storage media that are, in turn, stored on storage shelves or the like inside the library in a fashion that renders the media, and its resident data, accessible for physical retrieval. Such media is commonly termed "removable media." Data storage media may comprise any type of media on which data may be stored and which may serve as removable media, including but not limited to magnetic media (such as magnetic tape or disks), optical media (such as optical tape or disks), electronic media (such as PROM, EEPROM, flash PROM, Compactflash™, Smartmedia™, Memory Stick™, etc.), or other suitable media. Typically, the data stored in automated data storage libraries is resident on data storage media that is contained within a cartridge and referred to as a data storage media cartridge. An example of a data storage media cartridge that is widely employed in automated data storage libraries for mass data storage is a magnetic tape cartridge.

In addition to data storage media, automated data storage libraries typically contain data storage drives that store data to, and/or retrieve data from, the data storage media The transport of data storage media between data storage shelves and data storage drives is typically accomplished by one or more robot accessors (hereinafter termed "accessors"). Such accessors have grippers for physically retrieving the selected data storage media from the storage shelves within the automated data storage library and transport such media to the data storage drives by moving in the horizontal "X" and vertical "Y" directions.

Currently, most tertiary storage automation by libraries are tape automation, not optical automation made for ANIS standard optical cartridges. With holographic media becoming more and more viable, the question is how to deploy it. One known solution involves a disposal of a holographic disk in a modified (for holography) optical cartridge which is in it's external dimensions identical to an ANSI standard optical cartridge used for magnetic-optical disks. This not only adds significantly to the cost to manufacture, it also is relatively inefficient volumetrically. Thus, there is a need for a solution for incorporating optical automation into libraries in an efficient and effective manner.

SUMMARY OF THE INVENTION

The present invention provides a new and unique optical removable media, particularly suitable for housing holographic disks.

One form of the present invention is a removable disk media comprising a tape cartridge shell and one or more optical disks. The tape cartridge shell has a structural configuration operable to be physically engaged by a cartridge shell gripper of a media accessor. Each optical disk is disposed within the tape cartridge shell. A recording surface of each optical disk is extractable, partially or entirely, from the tape cartridge shell by an optical disk drive for writing data onto the optical disk and/or reading data from the optical disk.

A second form of the present invention is an automated data storage library comprising a media accessor and a removable disk media. The media accessor includes a cartridge shell gripper. The removable disk media includes a tape cartridge shell having a structural configuration operable to be physically engaged by the cartridge shell gripper. The removable disk media further includes one or more optical disks disposed within the tape cartridge shell. A recording surface of each optical disk is extractable, partially or entirely, from the tape cartridge shell by an optical disk drive for writing data onto the optical disk and/or reading data from the optical disk.

A third form of the present invention is an automated data storage library comprising a media accessor, an optical disk drive and a removable disk media The media accessor includes a cartridge shell gripper. The optical disk drive includes a tape cartridge slot. The removable disk media includes a tape cartridge shell having a structural configuration operable to be physically engaged by the cartridge shell gripper and operable to be physically inserted into the tape cartridge slot by the cartridge shell gripper. The removable disk media further includes one or more optical disks disposed within the tape cartridge shell. A recording surface of each optical disk is extractable, partially or entirely, from the tape cartridge shell by the optical disk drive for writing data onto the optical disk and/or reading data from the optical disk.

The forgoing forms and other forms as well as well as objects, features and advantages of the present invention will become further apparent from the following detailed description of the various embodiments of the present invention, read in conjunction with the accompanying drawings. The detailed description and drawings are merely illustrative of the present invention rather than limiting, the scope of the present invention being defined by the appended claims and equivalents thereof.

DETAILED DESCRIPTION OF THE PRESENT INVENTION

This invention is described in preferred embodiments in the following description with reference to the Figures, in which like numerals represent the same or similar elements. While this invention is described in terms of the best mode for achieving this invention's objectives, it will be appreciated by those skilled in the art that it is intended to cover alternatives, modifications, and equivalents as may be included within the spirit and scope of the invention as defined by the appended claims.

The invention will be described as embodied in an automated magnetic tape library storage system for use in a data processing environment. Although the invention shown uses magnetic tape cartridges, one skilled in the art will recognize the invention equally applies to optical disk cartridges or other removable storage media and the use of either different types of cartridges or cartridges of the same type having different characteristics. Furthermore the description of an automated magnetic tape storage system is not meant to limit the invention to magnetic tape data processing applications as the invention herein can be applied to any media storage and cartridge handling systems in general.

Figure 1:
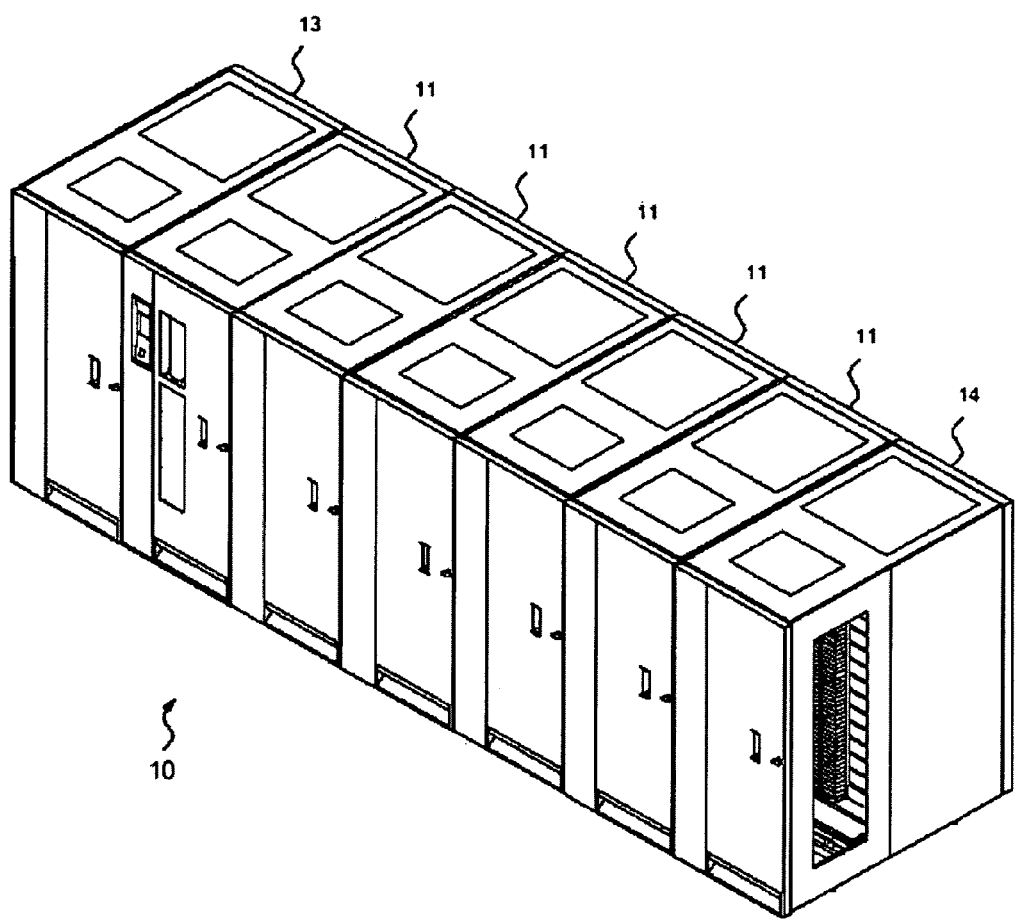
FIG. 1 is an isometric view of an automated data storage library adaptable to implement an embodiment of the present invention, with the view specifically depicting a library having a left hand service bay, multiple storage frames and a right hand service bay.
Figure 2:
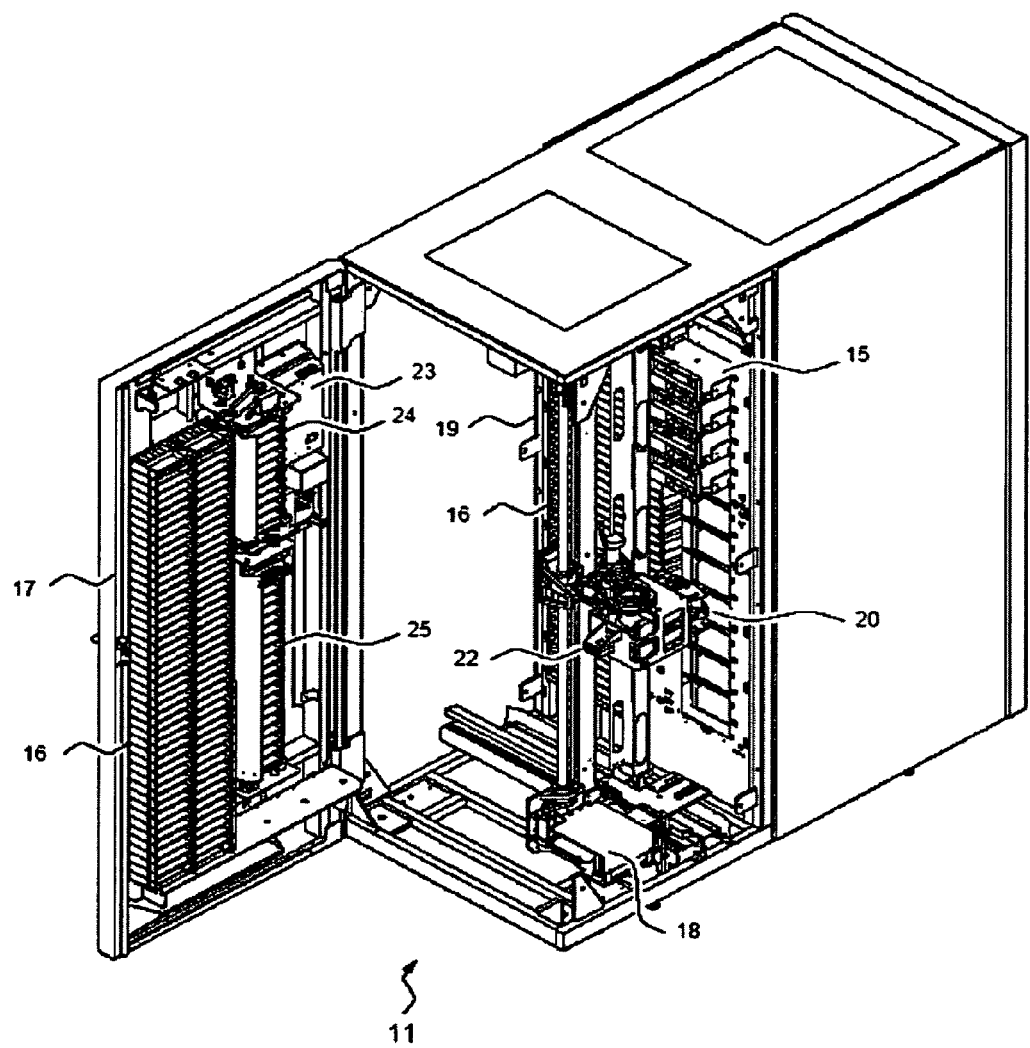
FIG. 2 is an isometric view of an automated data storage library adaptable to implement an embodiment of the present invention, with the view specifically depicting an exemplary basic configuration of the internal components of a library.

Turning now to the Figures, FIGS. 1 and 2 illustrate an automated data storage library 10 which stores and retrieves data storage cartridges containing data storage media (not shown) in storage shelves 16. It is noted that references to "data storage media" herein refer to data storage cartridges, and for purposes herein the two terms are used synonymously. An example of an automated data storage library which may implement the present invention, and has a configuration as depicted in FIGS. 1 and 2, is the IBM 3584 UltraScalable Tape Library. The library of FIG. 1 comprises a left hand service bay 13, one or more storage frames 11, and right hand service bay 14. As will be discussed, a frame may comprise an expansion component of the library. Frames may be added or removed to expand or reduce the size and/or functionality of the library. Frames may comprise additional storage shelves, drives, import/export stations, accessors, operator panels, etc.

FIG. 2 shows an example of a storage frame 11, which is the base frame of the library 10 and is contemplated to be the minimum configuration of the library. In this minimum configuration, there is only a single accessor (i.e., there are no redundant accessors) and there is no service bay. The library 10 is arranged for accessing data storage media in response to commands from at least one external host system (not shown), and comprises a plurality of storage shelves 16 on front wall 17 and rear wall 19 for storing data storage cartridges that contain data storage media; at least one data storage drive 15 for reading and/or writing data with respect to the data storage media; and a first accessor 18 for transporting the data storage media between the plurality of storage shelves 16 and the data storage drive(s) 15. The data storage drives 15 may be optical disk drives or magnetic tape drives, or other types of data storage drives as are used to read and/or write data with respect to the data storage media. The storage frame 11 may optionally comprise an operator panel 23 or other user interface, such as a web-based interface, which allows a user to interact with the library. The storage frame 11 may optionally comprise an upper I/O station 24 and/or a lower I/O station 25, which allows data storage media to be inserted into the library and/or removed from the library without disrupting library operation. The library 10 may comprise one or more storage frames 11, each having storage shelves 16 accessible by first accessor 18.

As described above, the storage frames 11 may be configured with different components depending upon the intended function. One configuration of storage frame 11 may comprise storage shelves 16, data storage drive(s) 15, and other optional components to store and retrieve data from the data storage cartridges. The first accessor 18 comprises a gripper assembly 20 for gripping one or more data storage media and may include a bar code scanner 22 or other reading system, such as a cartridge memory reader or similar system, mounted on the gripper 20, to "read" identifying information about the data storage media.

Figure 3:
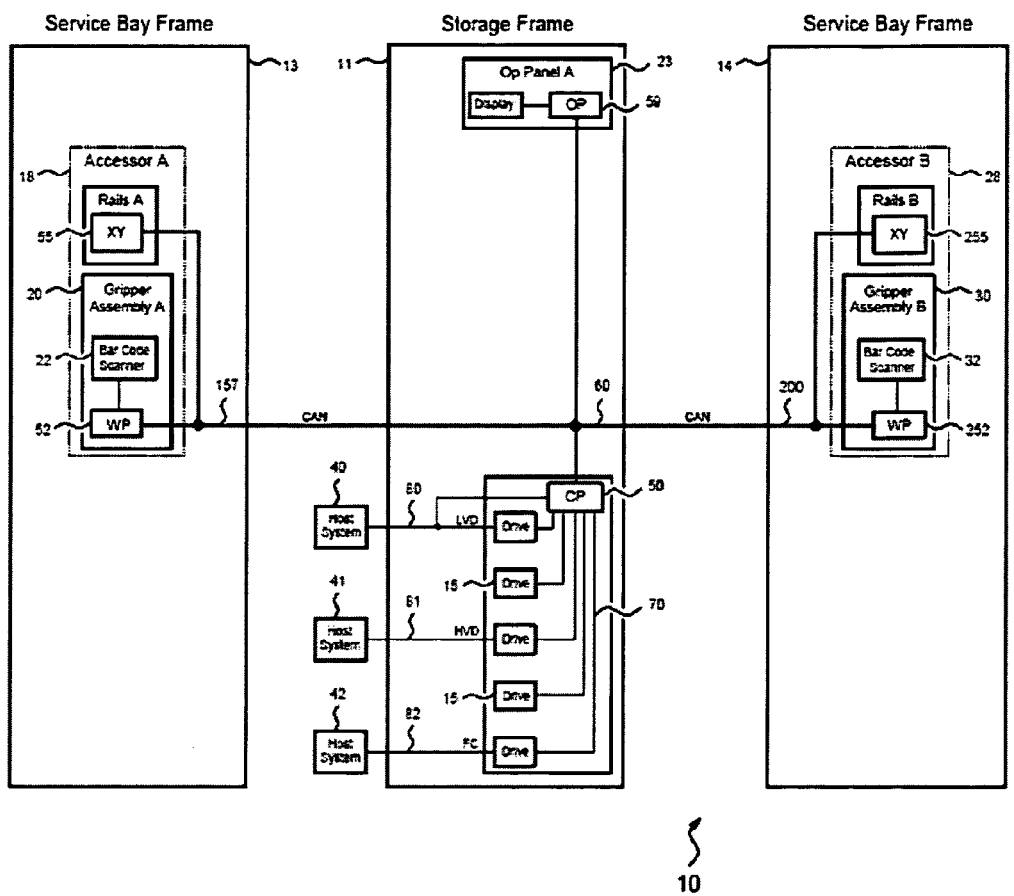
FIG. 3 is a block diagram of an automated data storage library adaptable to implement an embodiment of the present invention, with the diagram specifically depicting a library that employs a distributed system of modules with a plurality of processor nodes.

FIG. 3 illustrates an embodiment of an automated data storage library 10 of FIGS. 1 and 2, which employs a distributed system of modules with a plurality of processor nodes. An example of an automated data storage library which may implement the distributed system depicted in the block diagram of FIG. 3, and which implement the present invention, is the IBM 3584 UltraScalable Tape Library. For a fuller understanding of a distributed control system incorporated in an automated data storage library, refer to U.S. Pat. No. 6,356,803, which is entitled "Automated Data Storage Library Distributed Control System," which is incorporated herein for reference.

While the automated data storage library 10 has been described as employing a distributed control system, the present invention may be implemented in automated data storage libraries regardless of control configuration, such as, but not limited to, an automated data storage library having one or more library controllers that are not distributed, as that term is defined in U.S. Pat. No. 6,356,803. The library of FIG. 3 comprises one or more storage frames 11, a left hand service bay 13 and a right hand service bay 14. The left hand service bay 13 is shown with a first accessor 18. As discussed above, the first accessor 18 comprises a gripper assembly 20 and may include a reading system 22 to "read" identifying information about the data storage media. The right hand service bay 14 is shown with a second accessor 28. The second accessor 28 comprises a gripper assembly 30 and may include a reading system 32 to "read" identifying information about the data storage media. In the event of a failure or other unavailability of the first accessor 18, or its gripper 20, etc., the second accessor 28 may perform some or all of the functions of the first accessor 18. The two accessors 18, 28 may share one or more mechanical paths or they may comprise completely independent mechanical paths. In one example, the accessors 18, 28 may have a common horizontal rail with independent vertical rails. The first accessor 18 and the second accessor 28 are described as first and second for descriptive purposes only and this description is not meant to limit either accessor to an association with either the left hand service bay 13, or the right hand service bay 14.

In the exemplary library, first accessor 18 and second accessor 28 move their grippers in at least two directions, called the horizontal "X" direction and vertical "Y" direction, to retrieve and grip, or to deliver and release the data storage media at the storage shelves 16 and to load and unload the data storage media at the data storage drives 15.

The exemplary library 10 receives commands from one or more host systems 40, 41 or 42. The host systems, such as host servers, may communicate with the library directly, e.g., on path 80, through one or more control ports (not shown), or through one or more data storage drives 15 on paths 81, 82, providing commands to access particular data storage media and move the media, for example, between the storage shelves 16 and the data storage drives 15. The commands are typically logical commands identifying the media and/or logical locations for accessing the media The terms "commands" and "work requests" are used interchangeably herein to refer to such communications from the host system 40,41 or 42 to the library 10 as are intended to result in accessing particular data storage media within the library 10.

The exemplary library is controlled by a distributed control system receiving the logical commands from hosts, determining the required actions, and converting the actions to physical movements of first accessor 18 and/or second accessor 28.

In the exemplary library, the distributed control system comprises a plurality of processor nodes, each having one or more processors. In one example of a distributed control system, a communication processor node 50 may be located in a storage frame 11. The communication processor node provides a communication link for receiving the host commands, either directly or through the drives 15, via at least one external interface, e.g., coupled to line 80.

The communication processor node 50 may additionally provide a communication link 70 for communicating with the data storage drives 15. The communication processor node 50 may be located in the frame 11, close to the data storage drives 15. Additionally, in an example of a distributed processor system, one or more additional work processor nodes are provided, which may comprise, e.g., a work processor node 52 that may be located at first accessor 18, and that is coupled to the communication processor node 50 via a network 60, 157. Each work processor node may respond to received commands that are broadcast to the work processor nodes from any communication processor node, and the work processor nodes may also direct the operation of the accessors, providing move commands. An XY processor node 55 may be provided and may be located at an XY system of first accessor 18. The XY processor node 55 is coupled to the network 60, 157, and is responsive to the move commands, operating the XY system to position the gripper 20.

Also, an operator panel processor node 59 may be provided at the optional operator panel 23 for providing an interface for communicating between the operator panel and the communication processor node 50, the work processor nodes 52, 252, and the XY processor nodes 55, 255.

A network, for example comprising a common bus 60, is provided, coupling the various processor nodes. The network may comprise a robust wiring network, such as the commercially available CAN (Controller Area Network) bus system, which is a multi-drop network, having a standard access protocol and wiring standards, for example, as defined by CiA, the CAN in Automation Association, Am Weich Selgarten 26, D-91058 Erlangen, Germany. Other networks, such as Ethernet, or a wireless network system, such as RF or infrared, may be employed in the library as is known to those of skill in the art. In addition, multiple independent networks may also be used to couple the various processor nodes.

The communication processor node 50 is coupled to each of the data storage drives 15 of a storage frame 11, via lines 70, communicating with the drives and with host systems 40, 41 and 42. Alternatively, the host systems may be directly coupled to the communication processor node 50, at input 80 for example, or to control port devices (not shown) which connect the library to the host system(s) with a library interface similar to the drive/library interface. As is known to those of skill in the art, various communication arrangements may be employed for communication with the hosts and with the data storage drives. In the example of FIG. 3, host connections 80 and 81 are SCSI busses. Bus 82 comprises an example of a Fibre Channel bus which is a high speed serial data interface, allowing transmission over greater distances than the SCSI bus systems.

The data storage drives 15 may be in close proximity to the communication processor node 50, and may employ a short distance communication scheme, such as SCSI, or a serial connection, such as RS-422. The data storage drives 15 are thus individually coupled to the communication processor node 50 by means of lines 70. Alternatively, the data storage drives 15 may be coupled to the communication processor node 50 through one or more networks, such as a common bus network.

Additional storage frames 11 may be provided and each is coupled to the adjacent storage frame. Any of the storage frames 11 may comprise communication processor nodes 50, storage shelves 16, data storage drives 15, and networks 60.

Further, as described above, the automated data storage library 10 may comprise a plurality of accessors. A second accessor 28, for example, is shown in a right hand service bay 14 of FIG. 3. The second accessor 28 may comprise a gripper 30 for accessing the data storage media, and an XY system 255 for moving the second accessor 28. The second accessor 28 may run on the same horizontal mechanical path as first accessor 18, or on an adjacent path. The exemplary control system additionally comprises an extension network 200 forming a network coupled to network 60 of the storage frame(s) 11 and to the network 157 of left hand service bay 13.

In FIG. 3 and the accompanying description, the first and second accessors are associated with the left hand service bay 13 and the right hand service bay 14 respectively. This is for illustrative purposes and there may not be an actual association. In addition, network 157 may not be associated with the left hand service bay 13 and network 200 may not be associated with the right hand service bay 14. Depending on the design of the library, it may not be necessary to have a left hand service bay 13 and/or a right hand service bay 14.

Figure 4:
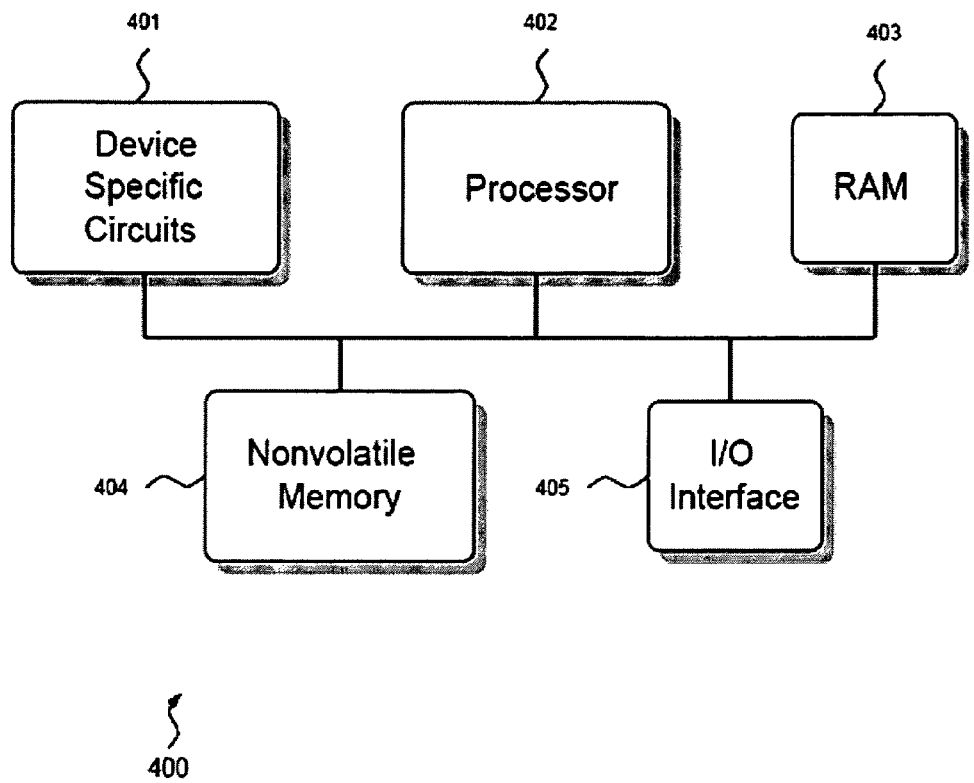
FIG. 4 is a block diagram depicting an exemplary controller configuration.

An automated data storage library 10 typically comprises one or more controllers to direct the operation of the automated data storage library. Host computers and data storage drives typically comprise similar controllers. A controller may take many different forms and may comprise, for example but not limited to, an embedded system, a distributed control system, a personal computer, or a workstation. Essentially, the term "controller" as used herein is intended in its broadest sense as a device that contains at least one processor, as such term is defined herein. FIG. 4 shows a typical controller 400 with a processor 402, RAM (Random Access Memory) 403, nonvolatile memory 404, device specific circuits 401, and I/O interface 405. Alternatively, the RAM 403 and/or nonvolatile memory 404 may be contained in the processor 402 as could the device specific circuits 401 and I/O interface 405. The processor 402 may comprise, for example, an off-the-shelf microprocessor, custom processor, FPGA (Field Programmable Gate Array), ASIC (Application Specific Integrated Circuit), discrete logic, or the like. The RAM (Random Access Memory) 403 is typically used to hold variable data, stack data, executable instructions, and the like. The nonvolatile memory 404 may comprise any type of nonvolatile memory such as, but not limited to, ROM (Read Only Memory), PROM (Programmable Read Only Memory), EEPROM (Electrically Erasable Programmable Read Only Memory), flash PROM (Programmable Read Only Memory), MRAM (Magnetoresitive Random Access Memory), battery backup RAM, hard disk drives, etc. The nonvolatile memory 404 is typically used to hold the executable firmware and any nonvolatile data. The I/O interface 405 comprises a communication interface that allows the processor 402 to communicate with devices external to the controller. Examples may comprise, but are not limited to, RS-232 (Recommended Standard), USB (Universal Serial Bus), SCSI (Small Computer Systems Interface), Fibre Channel, CAN (Controller Area Network), Ethernet, RF (Radio Frequency), Infrared, etc. The device specific circuits 401 may provide additional hardware to enable the controller 400 to perform unique functions such as, but not limited to, motor control of a cartridge gripper. The device specific circuits 401 may comprise electronics that provide, by way of example but not limitation, Pulse Width Modulation (PWM) control, Analog to Digital Conversion (ADC), Digital to Analog Conversion (DAC), Ethernet support, etc. In addition, all or part of the device specific circuits 401 may reside outside the controller 400.

While the automated data storage library 10 is described as employing a distributed control system, the present invention may be implemented in various automated data storage libraries regardless of control configuration, such as, but not limited to, an automated data storage library having one or more library controllers that are not distributed. A library controller may comprise one or more dedicated controllers of a prior art library or it may comprise one or more processor nodes of a distributed control system. Herein, library controller may comprise a single processor or controller or it may comprise multiple processors or controllers.

Figure 5:
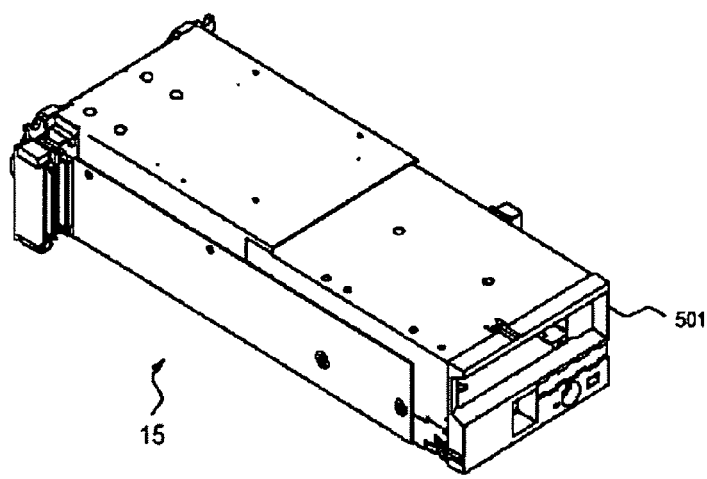
FIG. 5 is an isometric view of the front and rear of a data storage drive adaptable to implement an embodiment of the present invention.
Figure 5:
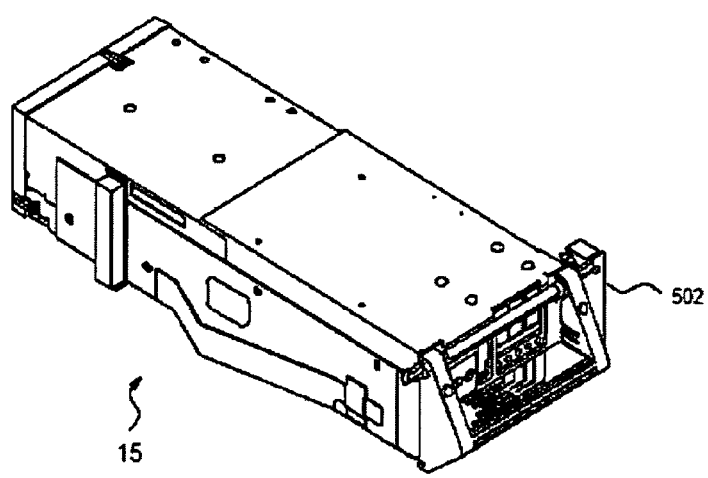

FIG. 5 illustrates an embodiment of the front 501 and rear 502 of a data storage drive 15. In the example of FIG. 5, the data storage drive 15 comprises a hot-swap drive canister. This is only an example and is not meant to limit the invention to hot-swap drive canisters. In fact, any configuration of data storage drive may be used whether or not it comprises a hot-swap canister.

Figure 6:
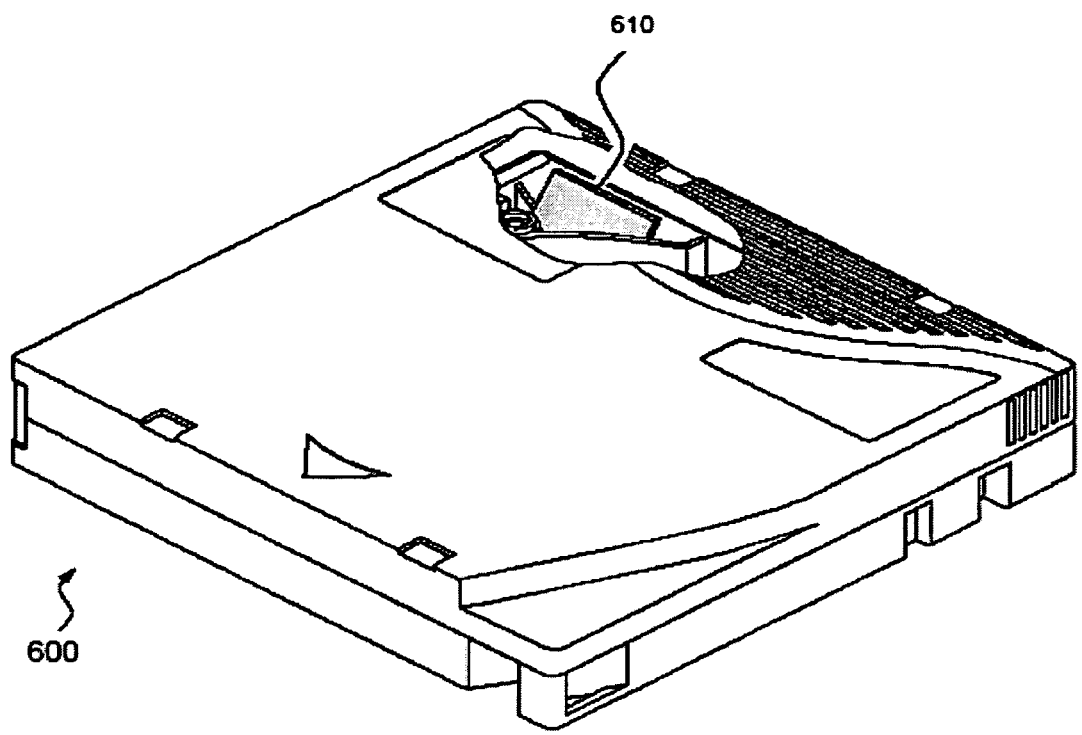
FIG. 6 is an isometric view of a data storage cartridge adaptable to implement an embodiment of the present invention.

FIG. 6 illustrates an embodiment of a data storage cartridge 600 with a cartridge memory 610 shown in a cutaway portion of the Figure. This is only an example and is not meant to limit the invention to cartridge memories. In fact, any configuration of data storage cartridge may be used whether or not it comprises a cartridge memory.

Figure 7:
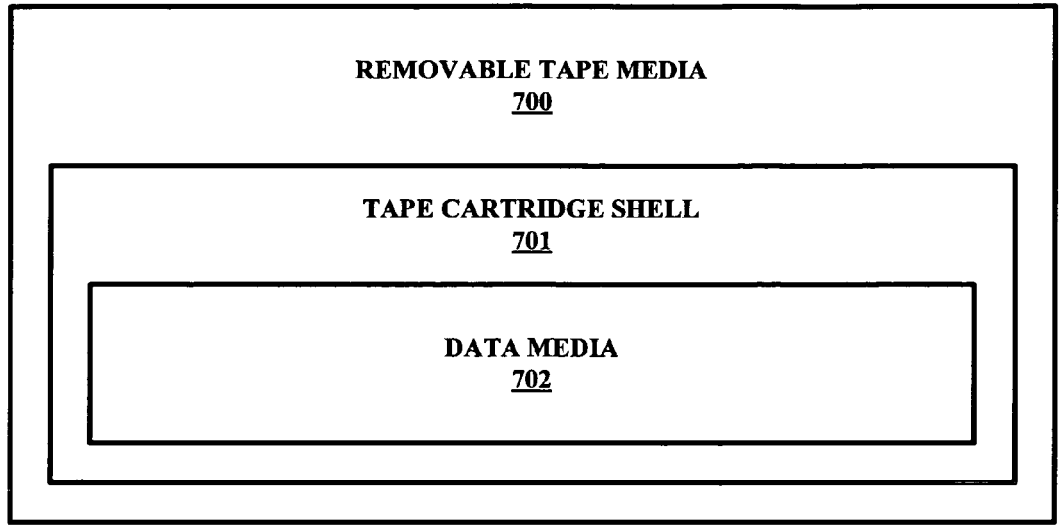
FIG. 7 illustrates a block diagram of a removable tape media as known in the art.

FIG. 7 illustrates a removable tape media 700 including a tape cartridge shell 701 physically configured to be engaged by a cartridge shell gripper of a media accessor as would be appreciated by those having ordinary skill in the art. Tape cartridge shell 701 serves as a storage tape casing for a storage tape 702 disposed within tape cartridge shell 701 for purposes of facilitating a reading of data recorded on storage tape 702 and/or a writing of data onto storage tape 702 as would be appreciated by those having ordinary skill in the art. An example of removable tape media 700 is a LTO magnetic tape cartridge as known in the art. Other examples are a 3592 cartridge and a STK 9×40 cartridge as known in the art.

Figure 8:
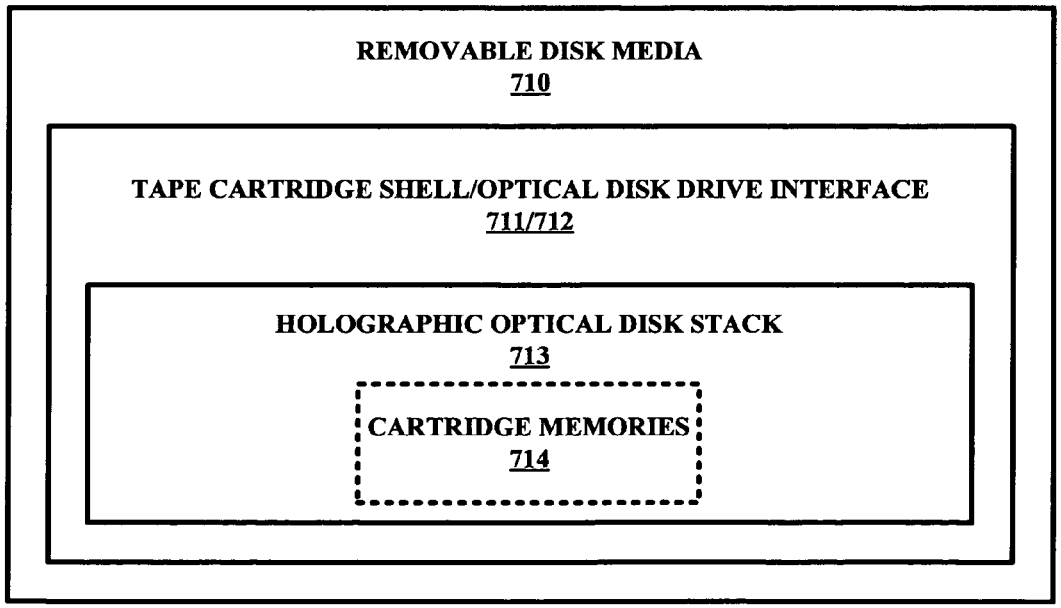
FIG. 8 illustrates a block diagram of a removable disk media in accordance with the present invention.

By comparison, FIG. 8 illustrates a removable disk media 710 of the present invention including a tape cartridge shell 711 as a modification of tape cartridge shell 701 (FIG. 7) involving an integration of an optical disk drive interface 712 into tape cartridge shell 701 without inhibiting the ability of a cartridge shell gripper to physically engage tape cartridge shell 701. This integration involves a combining of the tape cartridge shell 701 and the optical disk drive interface 712 to produce something that has elements of both (i.e., removable disk media 710). Herein, integration refers to a combination of two or more parts or elements to create an element or part that has characteristics of both. An integrated part may comprise a single part or may comprise multiple parts that are coupled, mated, assembled or joined together, etc. This modification of tape cartridge shell 701 provides removable disk media 710 with a physical configuration parallel to the physical configuration of cartridge 700 (FIG. 7) whereby the same cartridge shell gripper of a media accessor is capable of transporting removable tape media 700 and removable disk media 710 as needed within an automated data storage library. Herein, the same gripper may refer to the same physical gripper, or may refer to different grippers with the same, or substantially similar, gripper designs.

Optical disk drive interface 712 provides access to a holographic optical disk stack 713 disposed within tape cartridge shell 711. Holographic optical disk stack 713 includes a plurality of optical disks of any type formed from holographic storage material of any type as would be appreciated by those having ordinary skill in the art, such as, for example, CD-ROMs formed from $LiNbO_3$ storage material. A shape of a recording surface of each optical disk may be circular, rectangular or any other shape suitable for facilitating a secure and stable disposal of holographic optical disk stack 713 within tape cartridge shell 711 and for facilitating an storage interaction with a holographic storage system of an optical disk drive as will be further explained herein.

Holographic optical disk stack 713 may include cartridge memories 713 with each optical disk of stack 713 having one of the cartridge memories 713 embedded therein for purposes of storing optical disk identification information as would be appreciated by those having ordinary skill in the art.

Figure 9:
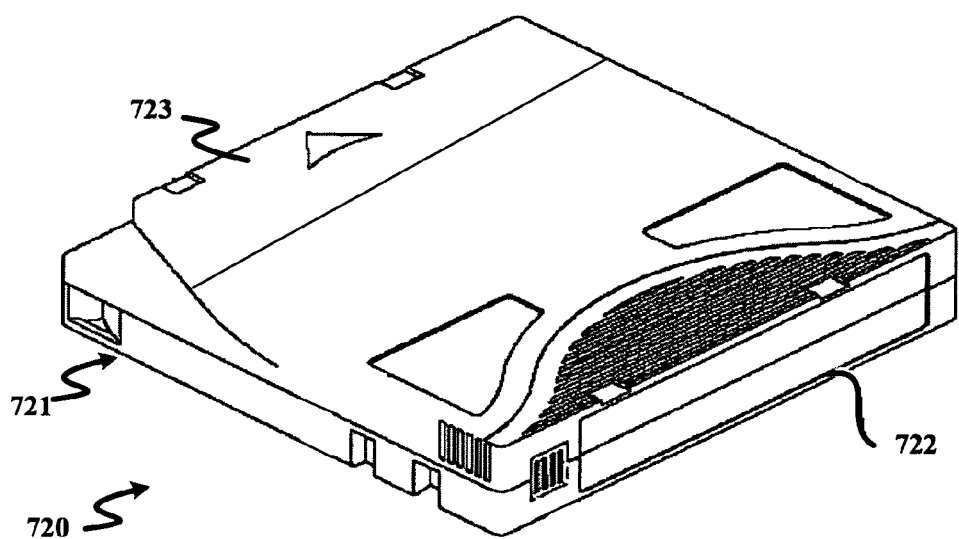
FIG. 9 illustrates a front isometric view of an exemplary embodiment of the removable disk media illustrated in FIG. 8 in accordance with the present invention.

FIG. 9 illustrates an exemplary removable disk media 720 including a tape cartridge shell 721 of an LTO tape cartridge having a bar code label location 722 on a front side of an external surface of tape cartridge shell 721. A holographic optical disk stack is disposed within tape cartridge shell 721 (not shown for clarity purposes)as well as other components for securely and stably operating the holographic optical disk stack within tape cartridge shell 721 (not shown for clarity purposes).

Tape cartridge shell 721 further has an optical disk drive interface in the form of a hinged door 732 formed on a rear end of tape cartridge shell 721. In one embodiment, hinged door 732 can be open when inserted in an optical disk drive such that nearly the full cross-sectional volume of tape cartridge shell 721 is exposed wherein an optical disk extractor of the optical disk driver can be operated to extract one of the optical disks to a degree that facilitates access to a recording surface of the extracted optical disk by a holographic storage system of the optical disk drive as will be further explained herein.

Figure 10:
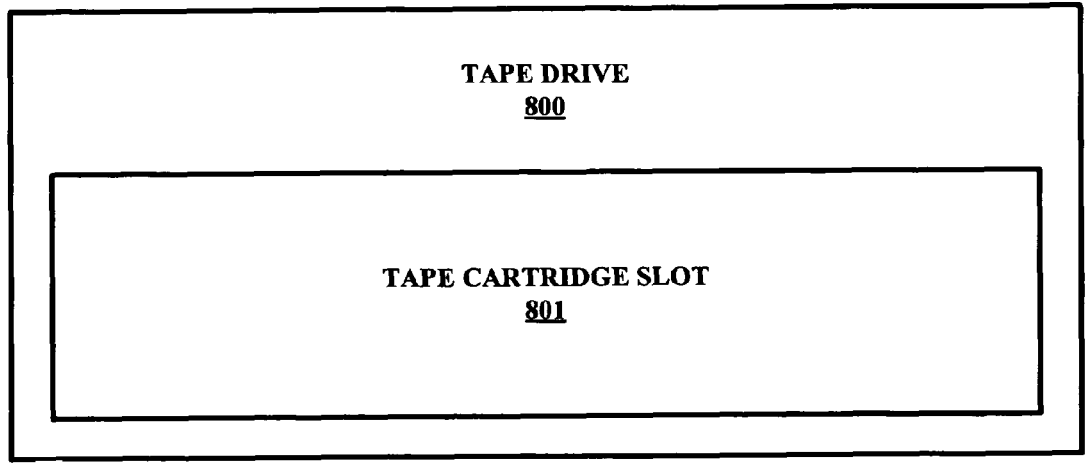
FIG. 10 illustrates a block diagram of a tape drive as known in the art.

FIG. 10 illustrates a tape drive 800 including a tape cartridge slot 801 for securely inserting removable tape media 700 (FIG. 7) therein as would be appreciated by those having ordinary skill in the art. While removable disk media 710 (FIG. 8) can be securely inserted within tape cartridge slot 801 in view of its use of tape cartridge shell 711 as would be appreciated by those having ordinary skill in the art, it would not be appropriate to insert removable disk media 710 (FIG. 8) within tape cartridge slot 801 because tape drive 800 is designed to interact with the storage tape 702 of removable tape media 700 and is not designed to interact with optical disks.

Figure 11:
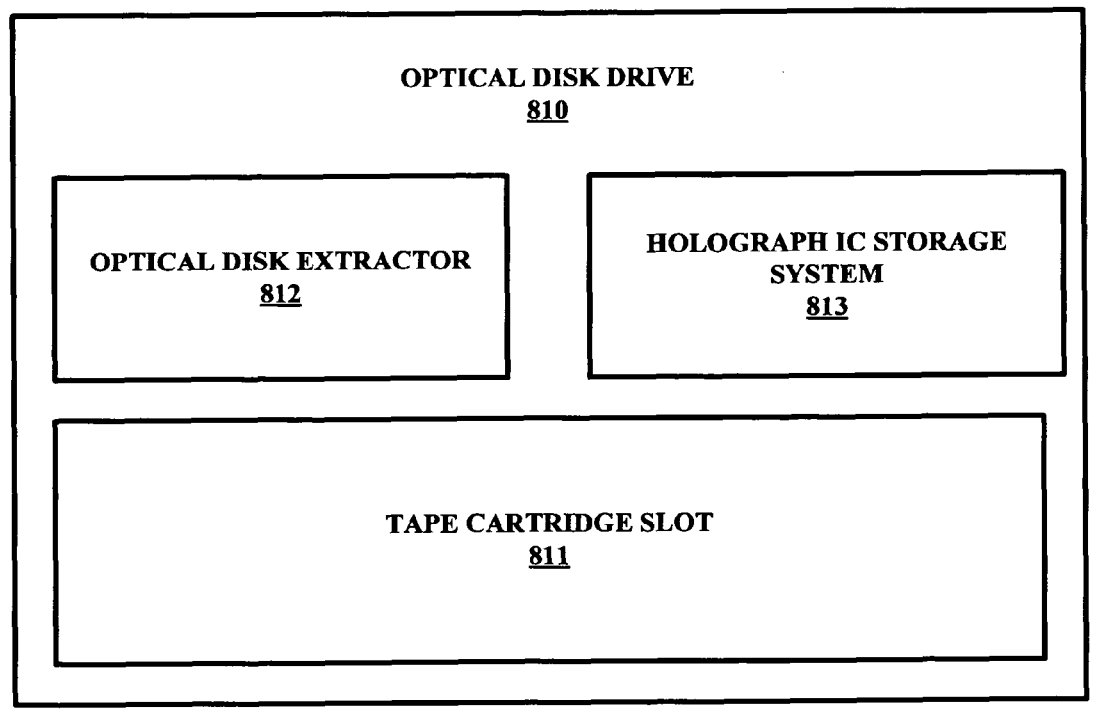
FIG. 11 illustrates a block diagram of an optical disk drive in accordance with the present invention.

By comparison, FIG. 11 illustrates a tape drive 810 including a tape cartridge slot 811 for securely inserting removable disk media 710 (FIG. 8) therein as would be appreciated by those having ordinary skill in the art. While removable tape media 700 (FIG. 7) can be securely inserted within tape cartridge slot 811 in view of its use of tape cartridge shell 701 as would be appreciated by those having ordinary skill in the art, it would not be appropriate to insert removable tap media 700 within tape cartridge slot 811 because optical disk drive 810 is designed to interact with the holographic optical disk stack 713 of removable disk media 710 and is not designed to interact with storage tape. To this end, optical disk drive 810 further includes an optical disk extractor 812 for extracting a recording surface of an optical disk of stack 713, partially or entirely, from removable disk media 710 via optical disk drive interface 712 whereby a holographic storage system 813 can write data to and/or read data from the extracted recording surface.

Figure 12:
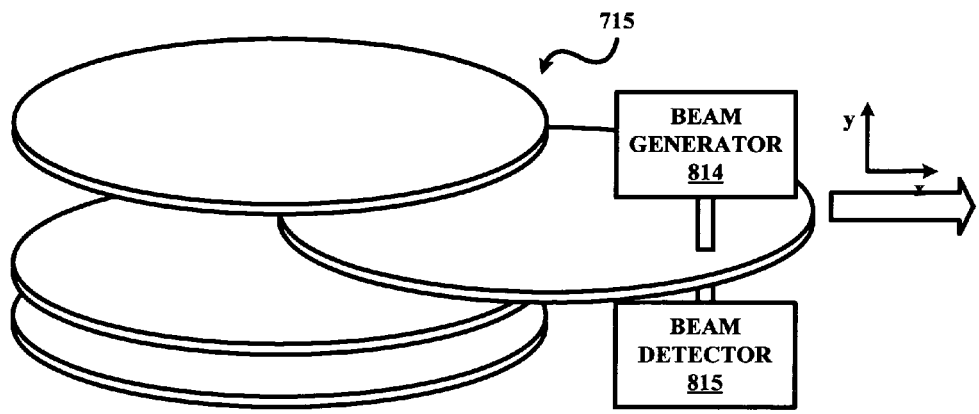
FIGS. 12-14 illustrate block diagrams of a storage interaction between a holographic optical disk stack and a holographic storage system in accordance with the present invention.

For example, as shown in FIG. 12, a recording surface of each optical disk of a holographic optical disk stack 715 is circular shaped to thereby facilitate a spinning of the optical disk by optical extractor 812 relative to a fixed position of a beam generator 814 and a beam detector 815 of holographic storage system 813. As such, optical extractor 812 will extract the recording surface at least to the point that a radial line of the recording surface can be accessed by beam generator 814 and beam detector 815. Normally, optical extractor 812 should extract the recording surface of the optical disk to the point that the center of rotation is accessible by a spindle or the like.

Figure 13:
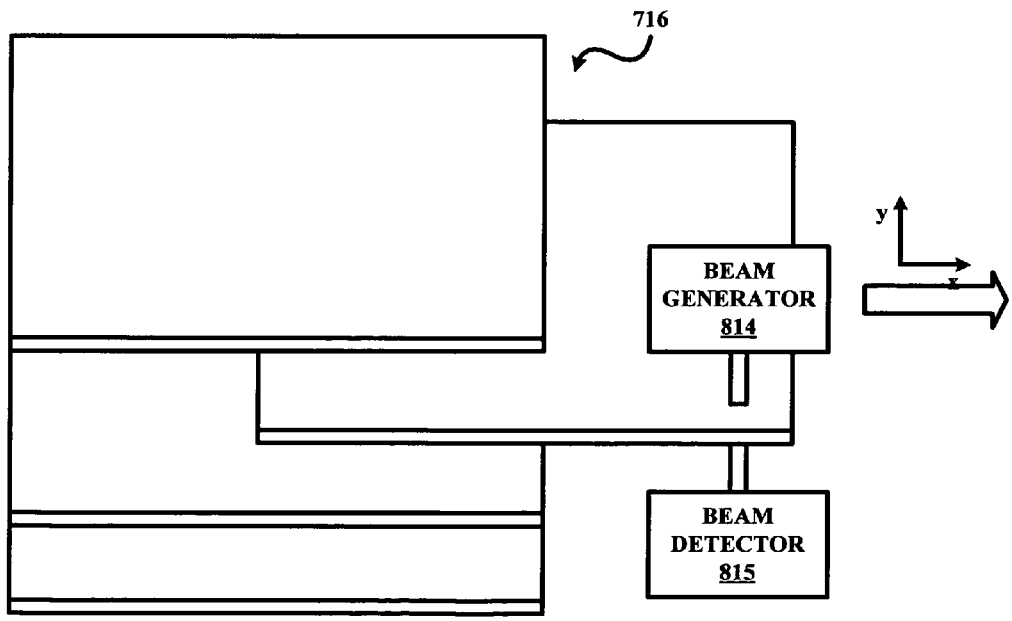

Also by example, as shown in FIG. 13, a recording surface of each optical disk of a holographic optical disk stack 716 is rectangular shaped to thereby facilitate a spinning of the optical disk by optical extractor 812 relative to a fixed position of beam generator 814 and beam detector 815 and/or to thereby facilitate a side-to-side movement of beam generator 814 and beam detector 815 relative to a fixed position of an extracted optical disk (e.g., in a "x" direction). As such, optical extractor 812 will extract the recording surface at least to the point that a radial line of the recording surface can be accessed by beam generator 814 and beam detector 815 (e.g., in a "y" direction).

Figure 14:
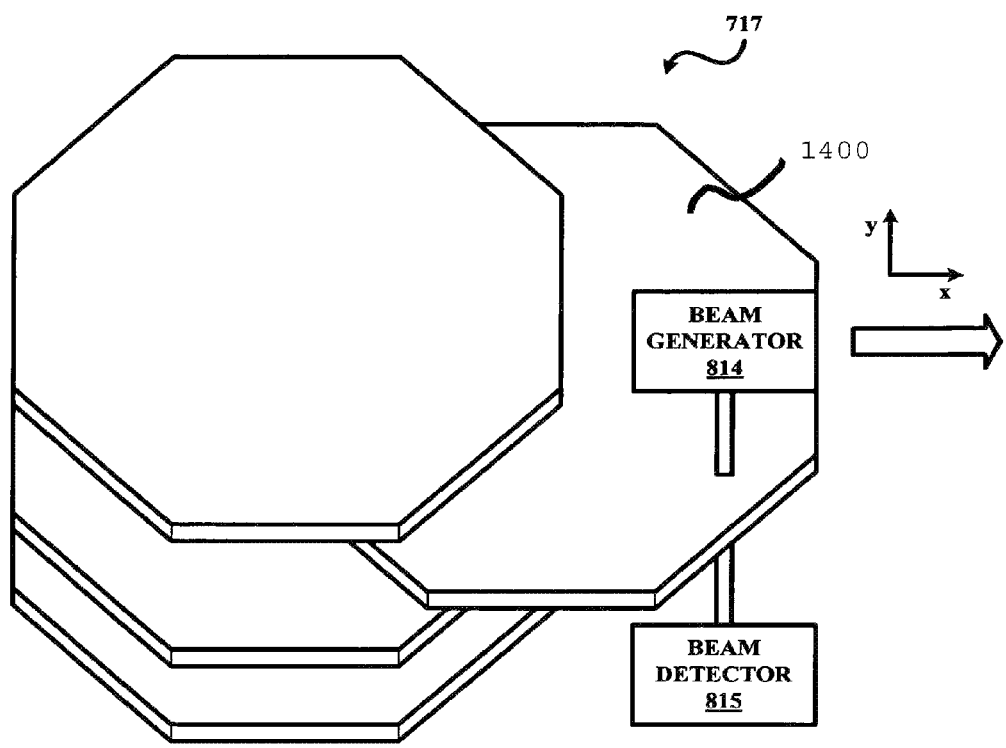

By further example, as shown in FIG. 14, a recording surface 1400 of each optical disk of a holographic optical disk stack 717 is octagonal shaped to thereby facilitate a spinning of the optical disk by optical extractor 812 relative to a fixed position of beam generator 814 and beam detector 815 and/or to thereby facilitate a side-to-side movement of beam generator 814 and beam detector 815 relative to a fixed position of an extracted optical disk (e.g., in a "x" direction). As such, optical extractor 812 will extract the recording surface at least to the point that a radial line of the recording surface can be accessed by beam generator 814 and beam detector 815 (e.g., in a "y" direction).

Those having ordinary skill in the art will appreciate the octagonal shape holographic optical disk stack 717 that provides straight outside lines for being held inside the tape cartridge shell, but which would allow rotation in a narrower 'x' direction of optical disk drive 810. Additionally, for a 120 mm square recording surface, a 170 mm of drive width of optical disk drive 810 would be needed to turn the recording surface 90 or 180 degrees in-plane yet it is desirable that the drive width be no more than 146 mm. In this case, an octagon shaped recording surface could be turned in drive width of 130 mm.

Referring to FIGS. 7-13, those having ordinary skill in the art will appreciate various advantages and benefits of the present invention, such as, for example, the use of removable disk media of the present invention in existing tape automations as well as future tape automations in an efficient volumetric manner.

While the embodiments of the present invention disclosed herein are presently considered to be preferred embodiments, various changes and modifications can be made without departing from the spirit and scope of the present invention. The scope of the invention is indicated in the appended claims, and all changes that come within the meaning and range of equivalents are intended to be embraced therein.

We claim:

1. A system, comprising:
   a tape cartridge shell having a structural configuration operable to be physically engaged by a cartridge shell gripper of a media accessor; and
   at least one optical disk of an octagonal holographic optical disk stack disposed within the tape cartridge shell, wherein a recording surface of each optical disk is at least partially extractable from the tape cartridge shell by an optical disk drive for at least one of writing data onto the optical disk and reading data from the optical disk, wherein:
   the octagonal holographic disk stack provides straight outside lines for being held inside the tape cartridge shell;
   the recording surface of the at least one optical disk of the octagonal holographic optical disk stack is octagonal shaped to facilitate a side-to-side movement of a beam generator and a beam detector relative to a fixed position of the at least one optical disk;
   an optical extractor extracts the recording surface of the at least one optical disk at least to a point such that a radial line of the recording surface is accessible by the beam generator and the beam detector, wherein the octagonal shaped recording surface requires a lesser drive width in comparison to a corresponding square recording surface.

2. The system of claim 1, wherein the recording surface of each optical disk includes a cartridge memory embedded therein to store optical disk identification information.

3. The system of claim 1, wherein the tape cartridge shell includes an optical disk drive interface operable to provide access to the at least one optical disk by the optical disk drive.

4. An automated data storage library, comprising:
   a media accessor including a cartridge shell gripper, and
   a removable disk media including:
   a tape cartridge shell having a structural configuration operable to be physically engaged by a cartridge shell gripper of a media accessor; and
   at least one optical disk of an octagonal holographic optical disk stack disposed within the tape cartridge shell, wherein a recording surface of each optical disk is at least partially extractable from the tape cartridge shell by an optical disk drive for at least one of writing data onto the optical disk and reading data from the optical disk, wherein:
   the octagonal holographic disk stack provides straight outside lines for being held inside the tape cartridge shell;
   the recording surface of the at least one optical disk of the octagonal holographic optical disk stack is octagonal shaped to facilitate a side-to-side movement of a beam generator and a beam detector relative to a fixed position of the at least one optical disk; and
   an optical extractor extracts the recording surface of the at least one optical disk at least to a point such that a radial line of the recording surface is accessible by the beam generator and the beam detector, wherein the octagonal shaped recording surface requires a lesser drive width in comparison to a corresponding square recording surface.

5. The automated data storage library of claim 4, wherein the recording surface of each optical disk includes a cartridge memory embedded therein to store optical disk identification information.

6. The automated data storage library of claim 4, wherein the tape cartridge shell includes an optical disk drive interface operable to provide access to the at least one optical disk by the optical disk drive.

7. An automated data storage library, comprising:
a media accessor including a cartridge shell gripper;
an optical disk drive including a tape cartridge slot; and
a removable disk media including:
   a tape cartridge shell having a structural configuration operable to be physically engaged by the cartridge shell gripper and operable to be physically inserted into the tape cartridge slot by the cartridge shell gripper; and
   at least one optical disk of an octagonal holographic optical disk stack disposed within the tape cartridge shell, wherein a recording surface of each optical disk is at least partially extractable from the tape cartridge shell by the optical disk drive for at least one of writing data onto the optical disk and reading data from the optical disk, wherein:
   the octagonal holographic disk stack provides straight outside lines for being held inside the tape cartridge shell;
   the recording surface of the at least one optical disk of the octagonal holographic optical disk stack is octagonal shaped to facilitate a side-to-side movement of a beam generator and a beam detector relative to a fixed position of the at least one optical disk; and
   an optical extractor extracts the recording surface of the at least one optical disk at least to a point such that a radial line of the recording surface is accessible by the beam generator and the beam detector, wherein the octagonal shaped recording surface requires a lesser drive width in comparison to a corresponding square recording surface.

8. The automated data storage library of claim 7, wherein the recording surface of each optical disk includes a cartridge memory embedded therein to store optical disk identification information.

9. The automated data storage library of claim 7, wherein the tape cartridge shell includes an optical disk drive interface operable to provide access to the at least one optical disk by the optical disk drive.

10. The automated data storage library of claim 7, wherein
the tape cartridge shell includes an optical disk drive interface operable to provide access to the at least one optical disk by the optical disk drive; and
wherein the optical disk drive includes the optical disk extractor operable to at least partially extract each optical disk from the tape cartridge shell by a use of the optical disk drive interface.

* * * * *